(12) United States Patent
Hamilton

(10) Patent No.: US 9,350,535 B2
(45) Date of Patent: May 24, 2016

(54) SECURE CONTENT DISTRIBUTION SYSTEM

(75) Inventor: Scott Hamilton, Los Angeles, CA (US)

(73) Assignee: FOX DIGITAL ENTERPRISES, INC., Los Angeles, CA (US)

( * ) Notice: Subject to any disclaimer, the term of this patent is extended or adjusted under 35 U.S.C. 154(b) by 1448 days.

(21) Appl. No.: 12/691,247

(22) Filed: Jan. 21, 2010

(65) Prior Publication Data

US 2010/0199084 A1 Aug. 5, 2010

Related U.S. Application Data

(60) Provisional application No. 61/146,381, filed on Jan. 22, 2009.

(51) Int. Cl.
| | |
|---|---|
| H04L 9/08 | (2006.01) |
| H04N 21/222 | (2011.01) |
| H04N 21/254 | (2011.01) |
| H04N 21/258 | (2011.01) |
| H04N 21/414 | (2011.01) |

(52) U.S. Cl.
CPC ............. *H04L 9/08* (2013.01); *H04N 21/2223* (2013.01); *H04N 21/2541* (2013.01); *H04N 21/25816* (2013.01); *H04N 21/41407* (2013.01); *H04L 2209/60* (2013.01)

(58) Field of Classification Search
CPC .. H04L 9/08; H04L 2209/60; H04N 21/2223; H04N 21/2541; H04N 21/25816; H04N 21/41407

USPC .............. 726/9, 26, 27, 29, 22; 713/224, 201, 713/212, 218, 220, 223, 150; 380/200, 201, 380/202, 203, 277, 279
See application file for complete search history.

(56) References Cited

U.S. PATENT DOCUMENTS

| | | | |
|---|---|---|---|
| 2009/0037388 A1* | 2/2009 | Cooper et al. ................... | 707/3 |
| 2010/0030744 A1* | 2/2010 | DeShan et al. ................... | 707/3 |

FOREIGN PATENT DOCUMENTS

| | | |
|---|---|---|
| WO | 0160012 | 8/2001 |
| WO | 2005086660 | 9/2005 |

OTHER PUBLICATIONS

Canadian Application No. 2,690,670 Office Action Issued Feb. 29, 2016, 4 pages.

* cited by examiner

*Primary Examiner* — Brandon Hoffman
*Assistant Examiner* — Nega Woldemariam
(74) *Attorney, Agent, or Firm* — Cantor Colburn LLP

(57) ABSTRACT

A secure system for online media content distribution is described, which system utilizes a proprietary, controlled environment media player. This player is specifically registered to a particular machine, directly downloads encrypted files from a media distributing server via a secure nugget browser, and retrieves secure decryption keys from a key distributing server via the registered player or the secure nugget browser.

10 Claims, 4 Drawing Sheets

SECURE CONTENT DISTRIBUTION SYSTEM

CROSS-REFERENCE TO RELATED APPLICATIONS

The present application claims priority to U.S. Provisional Patent Application Ser. No. 61/146,381 filed Jan. 22, 2009, the entire contents of which are specifically incorporated by reference herein.

BACKGROUND

Online video distribution inherently suffers from security problems. Piracy is a well known risk with distributed content. It is well known that online users typically freely share, post and exchange media files without regard to copyright laws.

Further, tracking of piracy is oftentimes impossible. Once the file is provided online, it is for the most part impossible to determine who has viewed, copied, posted, or exchanged the file.

The above-described and other problems in the prior art represent an unfortunate barrier to use of the Internet for delivery of media content. The marketplace would benefit from improved and effective ways to securely provide media online to a user.

SUMMARY

The above described and other disadvantages of the prior art are overcome and alleviated by the presently described secure system for online media content distribution, which system utilizes a proprietary, controlled environment media player. This player is specifically registered to a particular machine, directly downloads encrypted files from a media distributing server via a secure nugget browser, and retrieves secure decryption keys from a key distributing server via the registered player or the secure nugget browser.

The nugget browser is a safe, controlled browser that performs functions specific to the media retrieval and playback system. In exemplary embodiments, the nugget browser does not permit installation of third party plug-in applications or permit user-specified browsing (other than related to the media retrieval and playback system), for example by permitting user entry of URLs or Internet Protocol (IP) addresses.

In exemplary embodiments, nuggets provided by the browser may contain URLs of media available for download, URLs for media information, URLs for various web sites of interest, or media/movie posters, among others. By providing such nuggets, the requirement for users to manually enter URLs is obviated, and additional security is granted to the browser by virtue of the fact that the user cannot independently enter URLs.

In other exemplary embodiments, the player tracks file use history. For example, the player may insert or update watermark information into the file or associated with the file, such as player ID information, MAC address information, date and time of play information, etc.

In exemplary embodiments, a system server environment performs one or more of the following actions: distributes client players (in embodiments, the player may also be distributed freely since registration of the player ties the player to a particular machine); receives secure media (e.g., movie) download requests; uniquely encrypts or provides uniquely encrypted media files; records a registered player ID and/or MAC address of the machine requesting the transaction; serves client player nuggets; and provides or records transaction requests.

BRIEF DESCRIPTION OF THE DRAWINGS

Referring now to the drawings, wherein like elements are numbered alike in the following FIGURES.

DETAILED DESCRIPTION

Reference will now be made in detail to exemplary embodiments, examples of which are illustrated by the accompanying drawings. As indicated above, the presently described system provides a secure environment for online media content distribution, which system utilizes a proprietary, controlled environment media player. This player is specifically registered to a particular machine, directly downloads encrypted files from a media distributing server via a secure nugget browser, and retrieves secure decryption keys from a key distributing server via the registered player or the secure nugget browser.

Figure 1:
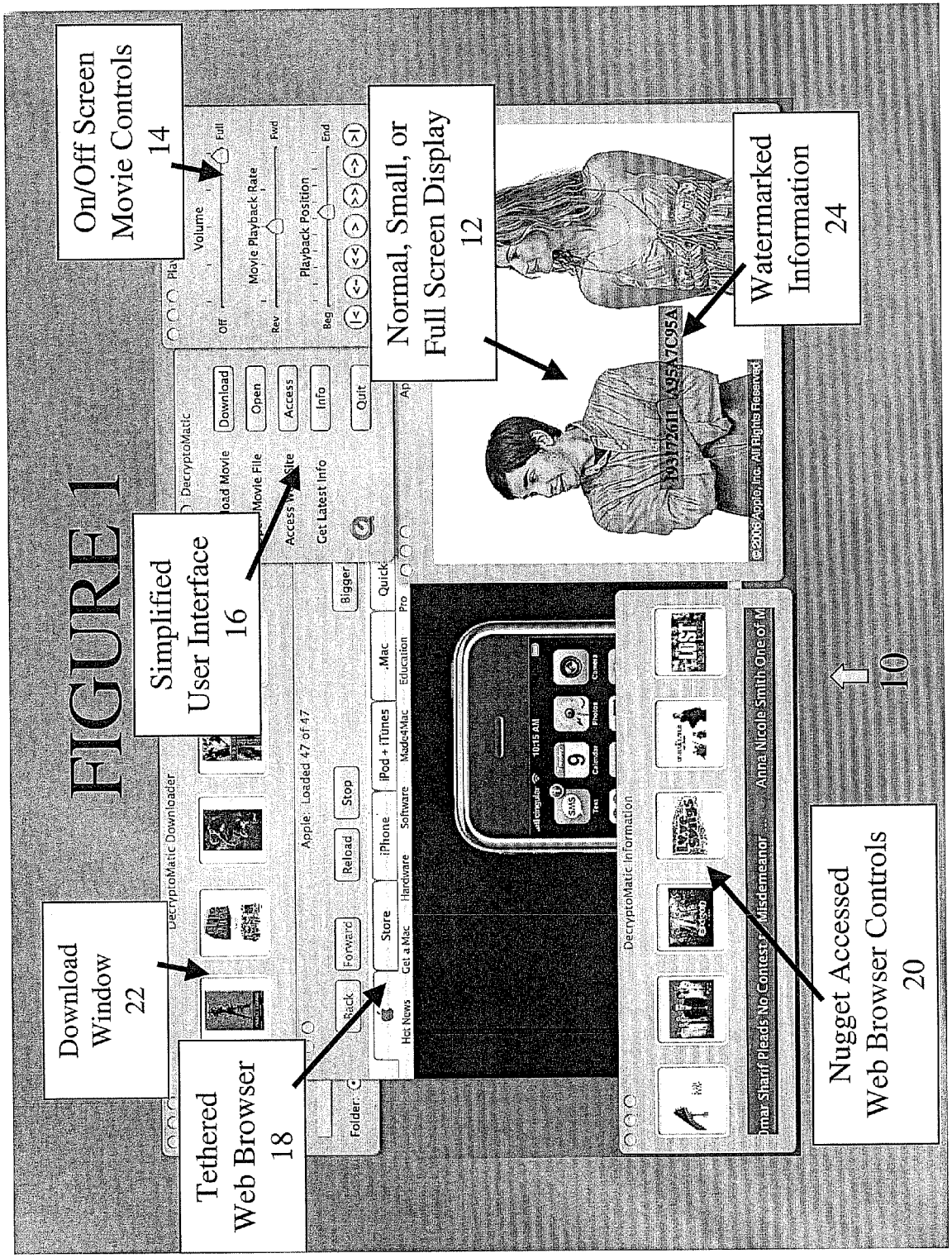
FIG. 1 is an exemplary visual display of a client-based interface for the secure media content delivery system described herein.

Reference is made to FIG. 1, which illustrates an exemplary user interface generally at 10. The exemplary interface includes a playback window or portion, 12, playback controls 14, and various browser portions. A simplified browser interface is shown at 16, which interface provides the user with quick options, such as "Download Movie", "Open Movie File", "Access Web Site", "Get Latest Info" and "Quit." A tethered web browser portion is shown at 18. Note that the illustrated web browser does not have a URL or IP address entry bar. A nugget based web browser control interface is shown at 20, which provides for pre-set (controlled by the application or server) navigation or informational nuggets that are selectable by a user. A download window is also illustrated at 22.

The nugget based browser provides a safe (if one can facilitate secure playback of media, as will be described below, one may also create a similar secure browser), controlled browser that performs functions specific to the media retrieval and playback system, or at least specific to desired pre-set (or updatable) server or application purposes. As was noted above, in exemplary embodiments, the nugget browser does not permit installation of third party plug-in applications or permit user-specified browsing (other than related to the media retrieval and playback system), for example by permitting user entry of URLs or Internet Protocol (IP) addresses.

Of course, functionality of the browser could be changed via download from the secure system, if desired.

In exemplary embodiments, nuggets provided by the browser may contain URLs of media available for download, URLs for media information, URLs for various web sites of interest, or media/movie posters, among others. By providing such nuggets, the requirement for users to manually enter URLs is obviated, and additional security is granted to the browser by virtue of the fact that the user cannot independently enter URLs. Benefits of nugget use are their size (generally less than 100 Kilobytes) and their dynamic nature. The nuggets may comprise e.g., thumbnail rows acting as image wells with associated push button overlays tied to URLs or executables.

Further such nuggets may be dynamically loaded, e.g., by logging into websites, by playing certain media, etc. Also, the browser may support a guide including such nuggets that is not downloaded, but instead derives from a networked server. The nugget browser environment may also be tailored to specific audiences, whether the forum is entertainment or other professional arenas (e.g., a physician's network), or the environment may permit selection from a plurality of different nugget browser environments. Other aspects may also be tailored, e.g., features on an associated player, upon selection of a particular environment.

The browser may also support targeted advertisements based upon the selected environment.

The above system alleviates and overcomes the problems of the prior art by providing a secure system including one or more of the following: a renewable player that may be freely distributed (registration ties the player to a machine); encrypted movie or other media files that may be freely distributed (receipt of a authorized decryption key by a registered player enables playback); and watermarking of the file by the player (visible watermarking, including position, size, color, font, sequence, etc. and/or invisible watermarking tied to a player registration to track usage).

In exemplary embodiments, the player is a private, branded application that supports specific application formats. For example, the player may be configured to support all Quick-Time Movie formats, among others. The files or streams themselves may be configured such that they will not play on any other player.

The player may be configured to decrypt specific media encryption types or standards, e.g., AES-128 encrypted movie files or streams. In embodiments, the player is configured to decrypt the files or streams within the player upon playout (after receiving a secure key transfer or transaction from a server.

An example of a generally secure player is the Quicktime player. With further use in a Coco environment, the complexity of the player is hidden. In an exemplary embodiment, the player performs decryption and watermarking in a given session without upsetting the CPU requirements within the personal computer (or set top box). One such method assumes that the player decryption and watermarking can gain access to RGB buffers without interfering with playback.

Figure 4:
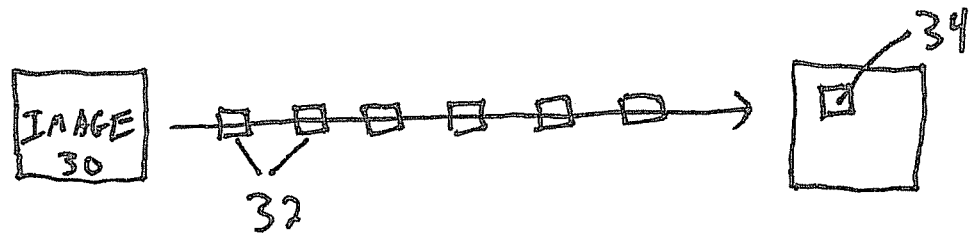
FIG. 4 is an exemplary flowchart illustrating a graphics rendering process utilizing an image source and a plurality of filter packets to render an resulting image.

In one embodiment, the graphics rendering is separated from direct action within the CPU. Thus, the general purpose CPU writes a plurality of small programs that are sent to the graphics CPU to enable proper graphics rendering. An example of a language suitable for such operation (e.g., on a subsystem of the general purpose CPU) is the Quartz language. Reference is made to FIG. 4, which illustrates an exemplary flowchart, wherein an image source 30 is sent to a graphics rendering process along with a plurality of packets 32 in a pipeline architecture to provide an image effect (e.g., with instructions to process a particular area 34).

However, the present disclosure recognizes that a problem generally arises in attempts to access individual packets 32, and thus RGB bitplanes, wherein access of the packets causes image stutter or rendering failure. Embodiments of the present disclosure present ways to implement figure decryption and watermarking insertion without interrupting graphics flow.

Figure 5:
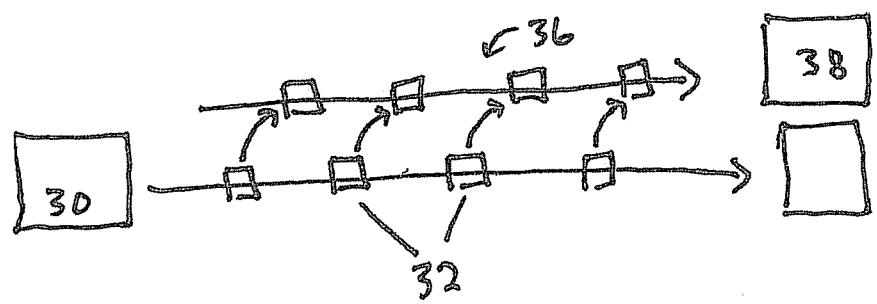
FIG. 5 an exemplary flowchart illustrating a decryption process utilizing an image source and a plurality of filter packets to render an resulting image from an alternate pipeline created by modifying filters within an original filter pipeline.

Referring now to FIG. 5, it is noted that two types of filters generate the packets 32 that go to the graphics rendering process. The first type includes memory associated with the filter. The second type does not include memory associated with it (and is thus inherently secure); This second type is a pure mathematical equation that only 'knows' what will happen to a single given pixel. Generally, the filters control, e.g., brightness, contrast, color change, gamma, etc. Embodiments of the present disclosure identify how to intersect such packets within the pipeline utilizing both filters that decrypt and filters that watermark to create a parallel pipeline, shown generally at 36.

One method for decryption involves interjection of a decryption filter between existing filter modules. Decryption does not require packet knowledge of placement within the image of other neighboring packets (however, watermarking does require such knowledge). Thus, decryption may be performed within the image instruction flow (within the RGB buffer stream) by affecting the memory filters to create the alternate pipeline 36.

Figure 6:
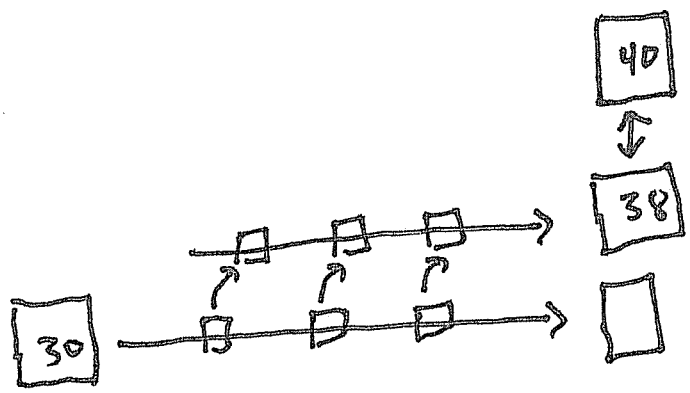
FIG. 6 is an exemplary flowchart illustrating a watermarking process utilizing a supplemental image layer composited with a decrypted image.

For watermarking, an exemplary embodiment creates a second image 40 off of the result image 38 (reference is made to FIG. 6). Thus, watermarking is performed at the results image rather than at a graphics instruction source. In exemplary embodiments, special watermarking symbols may be used, which symbols are radially symmetric (may be rotated in any direction but which may still be seen as a unique symbol; e.g., the symbol "V"). A composite image is created, building a resulting image having at least two layers. However, the brightness of the watermarking layer may be dramatically reduced, such that it is not readily evident to the viewer.

In other exemplary embodiments, the watermarking process inserts above about 10-12 such symbols in an image. Assuming a total set of, e.g., 52 such characters, $52^{12}$ unique image sets are possible. Thus, during each individual session, a unique set of symbols may be generated, and watermarking may be tied to playback within a specifically identified session. The symbols/watermarking may be tied by the player to the MAC address (media.access.control) of a machine utilizing the player (which accesses a network via, e.g., ethernet, bluetooth, or wireless).

In an exemplary embodiment, movie playback is prohibited unless the watermarking can be associated with a specific MAC address. Upon playback, the player may immediately create a watermark by selecting, e.g., 12 characters in random fashion to assign to the MAC address. The player may then take the MAC address, a session identifier, e.g., the time of day, and the unique watermark character set and send such information to a key server in a database to enable playback. In further exemplary embodiments, the player may also send a fake serial number for encrypting the upload. The server may then return a key (e.g., in an encrypted package) for decryption use by the player (however, the decryption key may be the same, e.g., for every individual media). Thus, decryption of the key package enables use of the media (e.g., movie) key to further decrypt the media.

Exemplary embodiments also provide a detection phase, wherein a plurality of frames (e.g., 10 minutes of playback) are tracked for moving parts within the image. When the moving parts are subtracted from the viewed frames, the watermarking is readily evident.

As is described above, the player may track file use history. For example, the player may insert or update watermark information (see FIG. 1, 24) into the file or associated with the file, such as player ID information, MAC address information, date and time of play information, etc.

In exemplary embodiments, a system server environment performs one or more of the following actions: distributes client players (in embodiments, the player may also be distributed freely since registration of the player ties the player to a particular machine); receives secure media (e.g., movie) download requests; uniquely encrypts or provides uniquely encrypted media files; records a registered player ID and/or MAC address of the machine requesting the transaction; serves client player nuggets; and provides or records transaction requests.

Figure 2:
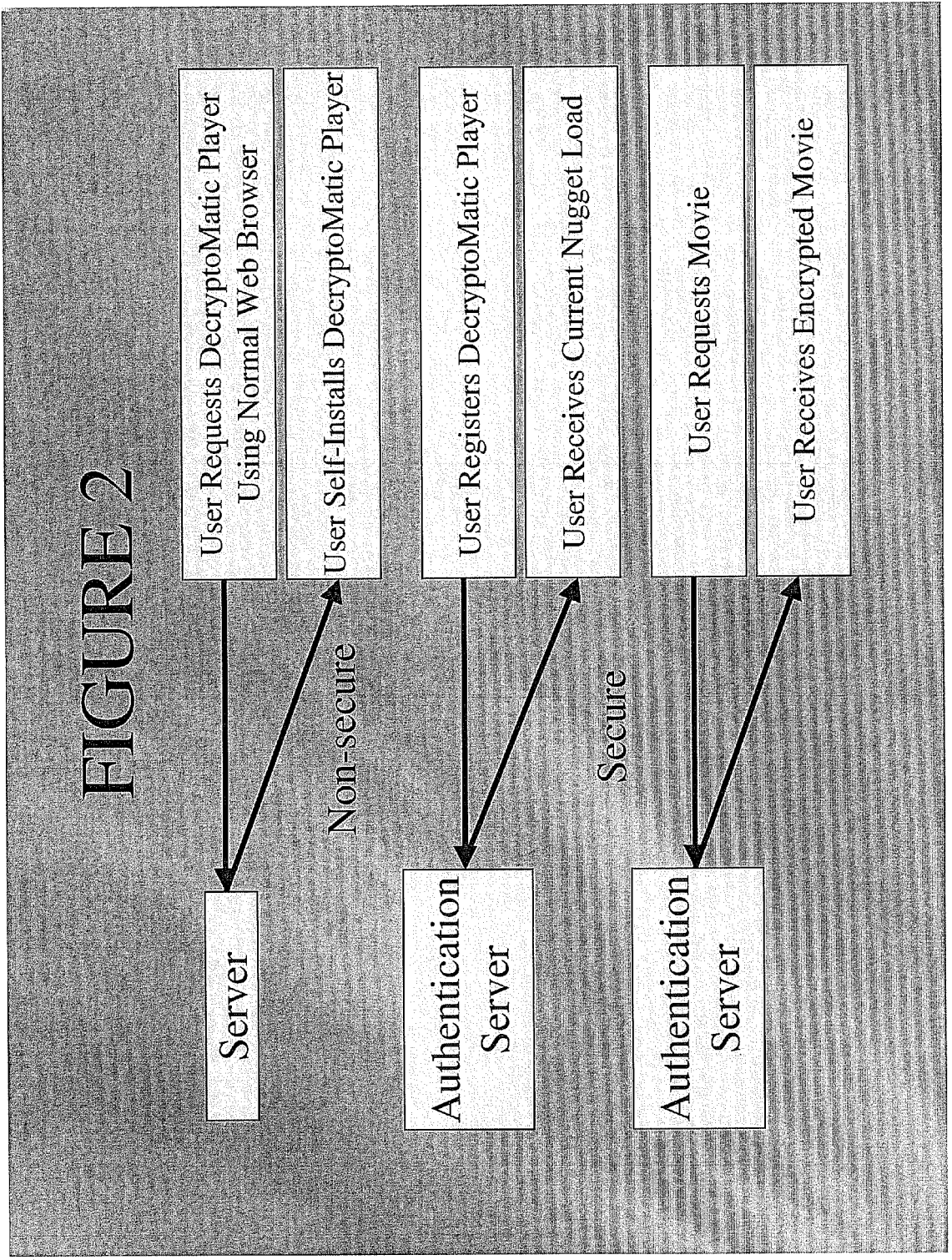
FIG. 2 is an operational flowchart describing setup of a machine with the secure player and browser and delivery of encrypted media content to the user via the same.

Referring now to FIG. 2, an operational flowchart is illustrated describing setup of a machine with the secure player and browser and delivery of encrypted media content to the user via the same. The server may receive a request for download of the player via a conventional browser (or the user may obtain the application bundle separately). Note that because a standard browser is used, this activity is not yet considered to be in the secure environment required for media playback. The user then installs the player application.

A secure environment is established when the player is running and registered. Within the secure environment, and via the browser portion of the player, the user may receive nuggets and request and receive encrypted media.

Figure 3:
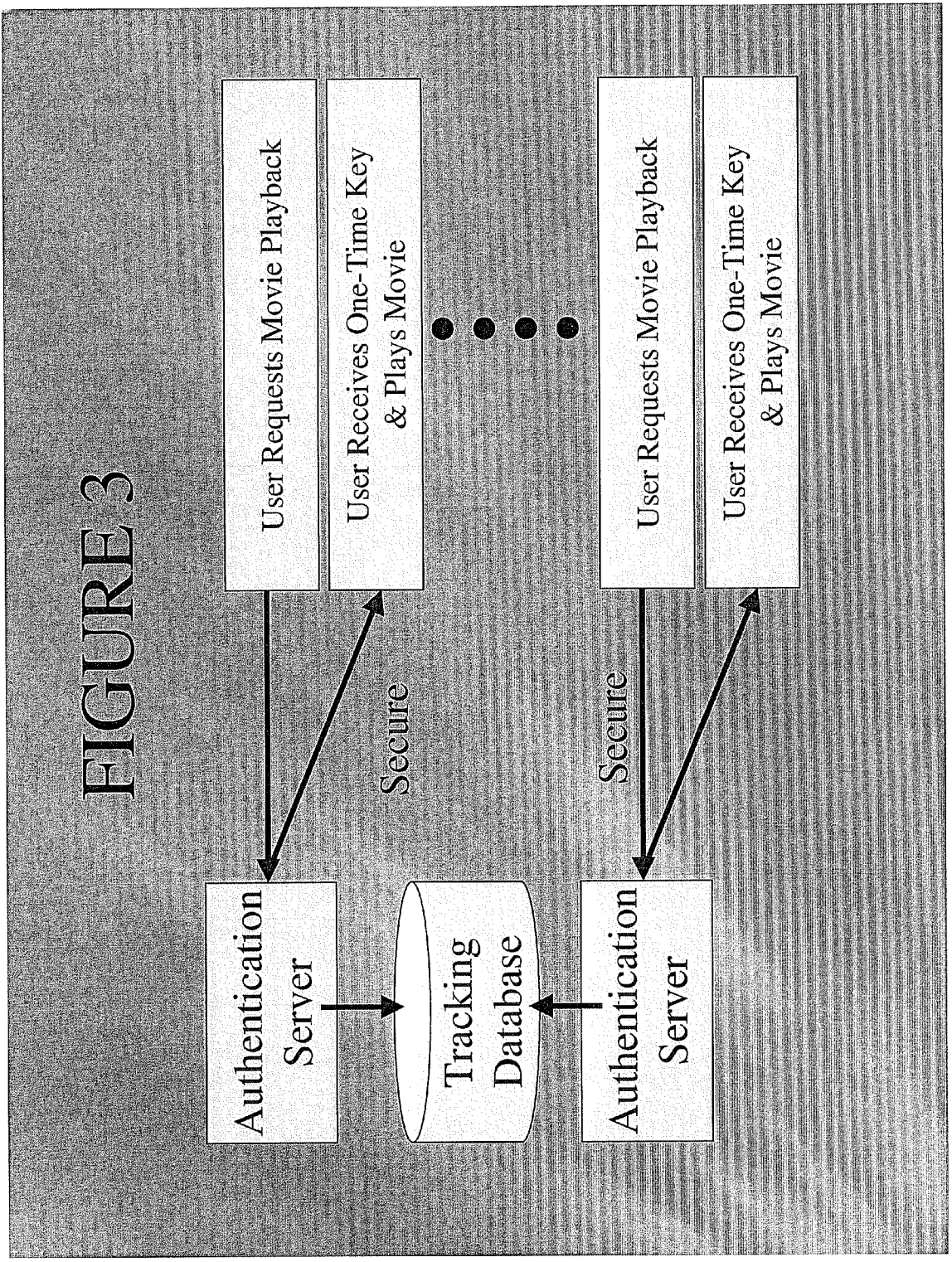
FIG. 3 is an operational flowchart depicting authorized decryption of media via interaction with a media server, along with transaction tracking.

FIG. 3 is an operational flowchart depicting authorized decryption of media via interaction with a media server, along with transaction tracking. In exemplary embodiments, once the user requests movie playback, the user receives a one-time key for such playback, and playback is enabled. In this exemplary embodiment, authorization is requested and a key is provided for each playback incidence. Further, the server may generate a tracking database specific to the player, user, MAC address, etc.

It will be apparent to those skilled in the art that, while exemplary embodiments have been shown and described, various modifications and variations can be made to the secure content distribution system disclosed herein without departing from the spirit or scope of the invention. Accordingly, it is to be understood that the various embodiments have been described by way of illustration and not limitation.

What is claimed is:

1. A secure content distribution system for online media content distribution, comprising:

a proprietary, controlled environment media player, said player being configured for specific registration to a particular machine, wherein said player directly downloads encrypted files from a media distributing server via a secure nugget browser and retrieves secure decryption keys from a key distributing server via the registered player or the secure nugget browser;

wherein the nugget browser does not permit installation of third party plug-in applications or permit non pre-approved browsing; and wherein said nugget browser does not permit user entry of URLs or Internet Protocol (IP) addresses.

2. A secure content distribution system in accordance with claim 1, wherein nuggets provided by the browser contain one or more of the following: URLs of media available for download; URLs for media information; URLs for various web sites of interest; and media or movie posters.

3. A secure content distribution system in accordance with claim 1, wherein the player tracks file use history.

4. A secure content distribution system in accordance with claim 3, wherein the player inserts or updates watermark information into the file or associated with the file.

5. A secure content distribution system in accordance with claim 4, wherein said information comprises player ID information, MAC address information, or date and time of play information.

6. A secure content distribution system in accordance with claim 1, wherein a system server environment performs one or more of the following actions: distributes client players (in embodiments, the player may also be distributed freely since registration of the player ties the player to a particular machine); receives secure media (e.g., movie) download requests; uniquely encrypts or provides uniquely encrypted media files; records a registered player ID and/or MAC address of the machine requesting the transaction; serves client player nuggets; and provides or records transaction requests.

7. A secure content distribution system in accordance with claim 1, wherein said player requires one-time player specific keys for content playback.

8. A secure content distribution system in accordance with claim 6, wherein a user interface comprises a content media play portion, a content media player control portion, and a nugget based browser.

9. A secure content distribution system in accordance with claim 8, wherein said nugget based browser comprises a simplified browser control portion, a browser window, and a nugget window having nuggets that are selectable by a user for navigation or to open informative nuggets.

10. A secure content distribution system in accordance with claim 1, wherein a server tracks a registered player's encryption key or file playback requests.

* * * * *